United States Patent Office 3,414,531
Patented Dec. 3, 1968

3,414,531
DECORATIVE COATING COMPOSITION FOR ACETAL PLASTIC SURFACES
Russell L. Sears, St. Clair Shores, and Robert G. Latham, Farmington, Mich., assignors, by mesne assignments, to Interchemical Corporation, New York, N.Y., a corporation of Ohio
No Drawing. Filed Aug. 13, 1965, Ser. No. 479,657
9 Claims. (Cl. 260—15)

ABSTRACT OF THE DISCLOSURE

The present invention relates to a decorative coating for direct application to acetal plastic surfaces comprising as a film-forming composition a three component system comprising a mixture of tris-β-chloro ethyl phosphate; a partial ester of a polysaccharide selected from the group consisting of nitrocellulose, cellulose acetate propionate and ethyl cellulose; and one of the resins selected from the group consisting of urea formaldehyde resins and amino formaldehyde resins.

---

The present invention relates to a decorative coating composition, and more particularly to a decorative coating composition for direct application to acetal plastic surfaces.

Acetal plastics are a relatively new commercially available material. Acetal plastics have several chemical and physical properties which permit the use thereof as a substitute in many applications for metals or previously used plastics. Acetal plastics, also known as polyoxymethylene, have the general formula $(CH_2O)_n$. This material may be modified by copolymerization with small amounts of other polymers, in which case it may be referred to as a polyoxymethylene copolymer.

Difficulty has been encountered in applying decorative coatings to acetal plastic parts. The plastic has a very slippery and solvent resistant surface. Conventional coatings, commonly used in the art, will not adhere to the slick and solvent resistant surface of acetal plastic parts. Three methods have been proposed for priming acetal plastics to permit the application of a conventional decorative topcoat. However, each method has disadvantages from the standpoint of practical mass production. One of the proposed systems comprises a chemical etching treatment of the plastic part which leaves a fragile, powdery coating on the surface. This coating acts as a primer. However, the powdery coating is easily damaged by abrasive contact with other materials, such as occurs during shipping or handling. If this coating is removed, a subsequently applied decorative coating will not adhere to the part. A second proposed system comprises a special primer which requires almost laboratory facilities to properly apply. The application of this primer involves the use of a very narrow baking temperature range which is very difficult to maintain in actual production line practice. The third proposed system comprises the application of a primer coating. However, this method requires a multiple operation requiring two coating applications with a drying operation for each. For some commercial uses of acetal a single application of a decorative coating without use of a separate primer is highly desirable in order to reduce the cost of manufacturing.

It is therefore a prime object of this invention to provide decorative coating composition for direct application to acetal plastic surfaces without the need for a prime coating.

The present invention relates to a decorative coating for direct application to acetal plastic comprising as ingredients of a film-forming composition, a mixture of (a) tris-β-chloro ethyl phosphate, (b) a partial ester of polysaccharide selected from the group consisting of nitrocellulose, cellulose acetate propionate, and ethyl cellulose and (c) one of the resins selected from the group consisting of urea formaldehyde resins and amino formaldehyde resins. The amino resins include aceto-guanamine formaldehyde, melamine-formaldehyde, benzo-guanamine formaldehyde and hexamethoxy methyl melamine.

The decorative coating composition of this invention is a three-component system. While materials from each of the three components are essential, additional components may be added, such as, additional resins, catalysts, pigments and suitable solvents.

The first component of the decorative coating composition is tris-β-chloro ethyl phosphate and the amount is approximately 45 to 83 percent by weight.

The second component of the decorative coating composition is a partial ester of a polysaccharide selected from the group consisting of nitrocellulose, cellulose acetate propionate and ethyl cellulose, and the amount is approximately 5 to 32 percent by weight.

The third component of the decorative coating composition is a resin selected from amino formaldehyde resins and urea formaldehyde resins, and the amount is approximately 9 to 32 percent by weight. The amino resins which have been found to be particularly applicable are acetoguanamine formaldehyde, melamine-formaldehyde, benzoguanamine formaldehyde and hexamethoxy methyl melamine.

These three essential components of the decorative coating composition are referred to as the "active" ingredients and are felt to combine chemically with the surface of the acetal plastic material and thereby exhibit a degree of adhesion, commonly associated with decorative coating applied to steel.

The three ingredients may be combined at a minimum weight of approximately 45 percent for the total of the three ingredients with an additional mixture of resins which have been described as "diluent" resins. This additional ingredient is believed not to enter into the reaction with the surface of the acetal plastic. The use of diluent resins presents several advantages including reduction in cost. Since many alkyd resins are suitable diluents for the system, colored enamels can be formulated using standard alkyd pigment paste as the means for coloring or pigmenting the composition. This has an economic advantage since specialized pigment pastes do not have to be stocked as would be the case with the use of the "active" ingredients alone.

The selected "diluent" resin is introduced as a solution in a solvent not harmful to the rest of the system. Thus, the amount and type of solvent introduced with a "diluent" resin is generally chosen with respect to nitrocellulose lacquer solvent blending formulation.

Examples of "diluent" resins which are found to be useful are oil modified alkyd resins (both the drying and non-drying types), polyurethane resins (diisocyanate vegetable oil adducts), polyurethane esters (diisocyanates reacted with a polyhydric alcohol and an organic acid), epoxy resins, epoxy ester resins, thermosetting acrylic resins, thermoplastic acrylic resins, styrene modified alkyd resins, vinyltoluene modified alkyd resins and oil modified polyester resins.

Examples of pigments which have been found useful for coloring both the "active" and "diluent" type compositions are: (numerals shown are parts by weight) lamp black (4), carbon black (2), titanium dioxide (16), lithopone (20), iron blue (6), phthalocyanine blue and green (5), chrome oxide green (10), red iron oxide (12), cadmium red (15), indanthrone blue and maroon (6), toluidine red (6), chrome yellow (15), molybdate orange (15), aluminum powder (non-leafing) (1), magnesium silicate (10), calcium carbonate (10) and barium sulfate (20). The above examples are not limited in regards to the type of pigment or amount used but are given only to serve as a guide as to what can be done in regards to the pigmentation. Many inerts may also be used for special effects, such as, texture or gloss. It has been found that best results are obtained at pigment volume concentrations of 20 percent or less. As the general rule, as the pigment volume increases, the adhesion of the enamel to the acetal surface usually decreases. It has been found that "good hiding" characteristics can be achieved when the dry film is from 0.5 mil to 2.0 mils of film thickness depending upon the type of pigment used and the vehicle system which is used.

It has been found that catalyst improves the chemical bonding between the acetal plastic and the coating. It is desirable in certain special applications, such as, interior automotive trim parts, garden tool handles, etc. to add a catalyst to the system in order to achieve still greater adhesion. An example of a catalyzed system would be the use of one of the following examples with one of the following catalysts in a conventional lacquer reducer.

100 grams of a 1% solution of—
  $BF_3$ dihydrate
  $BF_3$ methanol
  $BF_3$ tricresyl phosphate
  $BF_3$ ethylaniline
  $BF_3$ dimethylformamide
  $S_nCl_25H_2O$ The amount of catalyst and percent solution of catalyst is dependent upon the "diluent" vehicle used in the formulation and the desired viscosity. The range for best adhesion result is from 0.5 percent to 3 percent based on the behicle solids of the entire system.

The combined ingredients must, of course, be reduced with a solvent for application to a surface. An example of suitable solvent blend is as follows:

| | |
|---|---|
| Isoproponal | 45 |
| MIBK methylisobutyl ketone | 204 |
| Butyl alcohol | 46 |
| Toluene | 392 |

All of the examples of the decorative coating composition which are to follow were prepared in exactly the same manner. The ingredients were mixed together and ground to a fineness of 10μ in a porcelain mill. The finished composition was reduced by the addition of an equal volume of solvent for spray application to a surface.

Example I

| | Parts by weight |
|---|---|
| Soya and tung oil modified alkyd resin (50% NV) | 100 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example II

| | |
|---|---|
| Polyurethane ester (reaction product of an organic diisocyanate, fatty acid, and polyol) (50% NV) | 100 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example III

| | |
|---|---|
| Bisphenol A-epichlorohydrin (100% NV) | 50 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example IV

| | |
|---|---|
| Castor oil modified polyester resin (50% NV) | 100 |
| Tris-β chloro ethyl phosphate (100% NV) | 30 |
| Benzoguanamine formaldehyde resin (60% NV) | 17 |
| ½″ SS nitrocellulose solution (22% NV) | 23 |
| 5–6″ RS nitrocellulose solution (17.5% NV) | 29 |

Example V

| | |
|---|---|
| Thermosetting acrylic copolymer (50% NV) | 100 |
| Tris-β chloro ethyl phosphate (100% NV) | 30 |
| Melamine formaldehyde resin (60% NV) | 17 |
| ½″ SS nitrocellulose solution (22% NV) | 23 |
| 5–6″ RS nitrocellulose solution (17.5% NV) | 29 |

Example VI

| | |
|---|---|
| Methyl methacrylate/ethyl acrylate copolymer (50% NV) | 100 |
| Tris-β chloro ethyl phosphate (100% NV) | 30 |
| Benzoguanamine formaldehyde resin (60% NV) | 17 |
| ½″ SS nitrocellulose solution (22% NV) | 23 |
| 5–6″ RS nitrocellulose solution (17.5% NV) | 29 |

Example VII

| | |
|---|---|
| Vinyl toluene modified alkyd (50% NV) | 100 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example VIII

| | |
|---|---|
| Bisphenol A, linseed and soya fatty acid ester (50% NV) | 100 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example IX

| | |
|---|---|
| Linseed fatty acid, glycerin, isophthalic acid, benzoic acid and phenolic resin modified alkyd (40% NV) | 125 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example X

| | |
|---|---|
| Coconut fatty acid glycerin, paratertiary butyl benzoic acid, phthalic anhydride alkyd (60% NV) | 83 |
| Tris-β chloro ethyl phosphate (100% NV) | 30 |
| Acetoguanamine formaldehyde resin (60% NV) | 17 |
| ½″ SS nitrocellulose solution (22% NV) | 23 |
| 5–6″ RS nitrocellulose solution (17.5% NV) | 29 |

Example XI

| | |
|---|---|
| Tris-β chloro ethyl phosphate | 35 |
| Hexamethoxy methyl melamine | 7.5 |
| 17% RS N/C nitrocellulose solution | 22 |
| 22% SS N/C nitrocellulose solution | 17 |

Example XII

| | |
|---|---|
| Tris-β chloro ethyl phosphate (100% NV) | 60 |
| Acetoguanamine formaldehyde resin (60% NV) | 34 |
| ½″ SS nitrocellulose solution (22% NV) | 46 |
| 5–6″ RS nitrocellulose solution (17.5% NV) | 58 |

Example XIII

| | Parts by weight |
|---|---|
| Tris-β chloro ethyl phosphate (100% NV) | 85 |
| Cellulose acetate propionate (100% NV) | 15 |
| Toluene | 100 |
| Ethyl alcohol | 25 |

Add the following mixture to the above prior to application:

| | Parts by weight |
|---|---|
| Acetone | 50 |
| $BF_3$ dihydrate | 3 |

Flash one (1) minute and bake thirty (30) minutes at 285–300° F.

Example XIV

| | Parts by weight |
|---|---|
| Tris-β chloro ethyl phosphate (100% NV) | 84 |
| Acetoguanamine formaldehyde resin (60% NV) | 15 |
| Ethyl cellulose | 1 |
| Toluene | 10 |

Add the following mixture to the above prior to application:

| | Parts by weight |
|---|---|
| Acetone | 50 |
| BF₃ dihydrate | 3 |

Flash one (1) minute and bake thirty (30) minutes at 285–300° F.

Each of the foregoing embodiments of the composition were applied to acetal plastic parts with satisfactory results. In applying the coating, the plastic part was first wiped with a common solvent, such as xylol, to clean the surface. The clean surface was then coated with the composition. The method of application is not critical although spray techniques were used with the foregoing examples. Any common commercial means suitable for the part to be coated may be employed. For example, the coating may be applied by spraying, dipping, roller coating, airless spray and electrostatic spraying. After the coating is applied, it is air dried or flashed for a convenient non-critical period to permit a portion of a volatile material to evaporate. The non-criticality of the air-drying period is advantageous because it means that parts may be left in the air-drying stage for as much as 24 to 48 hours.

After air drying, the part is baked at a temperature from 250° to 300° F. for a time ranging from 15 to 60 minutes depending on the temperature employed. The baking temperature should not be above 324° F., as this is approximate melting temperature of acetal plastic. The dry-film thickness of the baked coating is not critical. Film thicknesses ranging from about 0.5 to 2.0 mils have given satisfactory results.

While illustrative embodiments of the invention have been described hereinbefore wtih particularity, it will be understood that various other modifications will be apparent to and can readily be made by those skilled in the art without departing from the scope and spirit of the invention. Accordingly, it is not intended that the scope of the claims appended hereto be limited to the examples and descriptions set forth herein, but rather that the claims be construed as encompassing all the features of patentable novelty which reside in the present invention including all features which would be treated as patentable equivalents thereof by those skilled in the art to which the invention pertains.

What is claimed is:

1. A coating composition for direct application to acetal plastic comprising, as the film-forming components, a mixture of (a) about 45 to 83 per cent by weight of tris-β chloro ethyl phosphate, (b) a partial ester of a polysaccharide selected from the group consisting of nitrocelluse, cellulose acetate propionate and ethyl cellulose, and (c) one of the resins selected from the group consisting of urea formaldehyde and amino formaldehyde resins.

2. A coating composition for direct application to acetal plastic comprising, as the film-forming components, a mixture of (a) about 45 to 83 per cent by weight of tris-β chloro ethyl phosphate, (b) a partial ester of a polysaccharide selected from the group consisting of nitrocellulose, cellulose acetate propionate and ethyl cellulose, and (c) a urea formaldehyde resin.

3. A coating composition for direct application to acetal plastic comprising, as the film-forming components, a mixture of (a) about 45 to 83 per cent by weight of tris-β chloro ethyl phosphate, (b) a partial ester of a polysaccharide selected from the group consisting of nitrocellulose, cellulose acetate propionate and ethyl cellulose, and (c) an amino formaldehyde resin.

4. The composition of claim 3 and further characterized in that the amino formaldehyde resin is selected from the group consisting of acetoguanamine formaldehyde, melamine formaldehyde, benzo-guanamine formaldehyde and hexamethoxy methyl melamine.

5. A coating composition for direct application to acetal plastic comprising, as the film-forming components, a mixture of (a) about 45 to 83 per cent by weight of tris-β chloro ethyl phosphate, (b) a partial ester of a poly-saccharide selected from the group consisting of nitrocellulose, cellulose acetate propionate and ethyl cellulose, (c) one of the resins selected from the group consisting of urea formaldehyde and amino formaldehyde resins, and (d) a diluent resin selected from the group consisting of alkyd resins, polyurethane resins, polyurethane ester resins, epoxy resins, epoxy ester resins, acrylic resins, modified alkyd resins and polyester resins.

6. A decorative composition for direct application to acetal plastic comprising, as the film-forming components, a mixture of (a) about 45 to 83 percent by weight of tris-β-chloro ethyl phosphate, (b) nitrocellulose, and (c) an amino formaldehyde resin.

7. The composition of claim 6 and further characterized in that the amino resin is hexamethoxy methyl melamine.

8. The composition of claim 6 and further characterized in that the amino resin is aceto-guanamine formaldehyde.

9. A coating composition for direct application to acetal plastic comprising, as the film-forming components, a mixture of (a) about 45 to 83 percent by weight of tris-β chloro ethyl phosphate, (b) nitrocellulose, and (c) an amino formaldehyde resin and an oil-modified alkyd resin.

References Cited
UNITED STATES PATENTS

| | | | |
|---|---|---|---|
| 3,658,941 | 10/1962 | Birum | 260—30.6 |
| 3,091,612 | 5/1963 | Stephens | 260—850 |
| 3,135,709 | 6/1964 | Lüneburg et al. | 260—850 |
| 3,161,609 | 12/1964 | Graham et al. | 260—30.6 |
| 3,248,246 | 4/1966 | Sears | 260—30.6 |
| 3,312,636 | 4/1967 | Rizzo | 260—45.7 |

WILLIAM H. SHORT, *Primary Examiner.*

E. M. WOODBERRY, *Assistant Examiner.*